C. BUSWELL.
Harrow.

No. 203,705. Patented May 14, 1878.

Witnesses:
George Thou,
Fred K. Benjamin.

Inventor
C. Buswell
By his attorney
Charles Tyler

UNITED STATES PATENT OFFICE.

COLUMBUS BUSWELL, OF ETNA, MAINE.

IMPROVEMENT IN HARROWS.

Specification forming part of Letters Patent No. 203,705, dated May 14, 1878; application filed January 25, 1877.

*To all whom it may concern:*

Be it known that I, COLUMBUS BUSWELL, of Etna, Penobscot county, Maine, have invented Improvements in Harrows, of which the following is a specification:

The object of my invention is a cultivator constructed as fully described hereinafter, to permit the independent movement of the arms carrying the teeth, to enable the operator to raise or lower them at will, so as to regulate the penetration of the teeth, to extend the teeth so as to harrow the entire width of the machine, and at the rear of the wheels, and to cut the ground before it is broken by the harrow-teeth.

Figure 1:
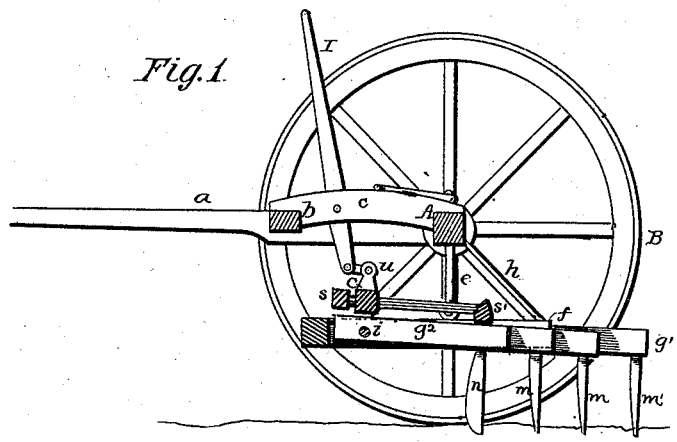
Figure 2:
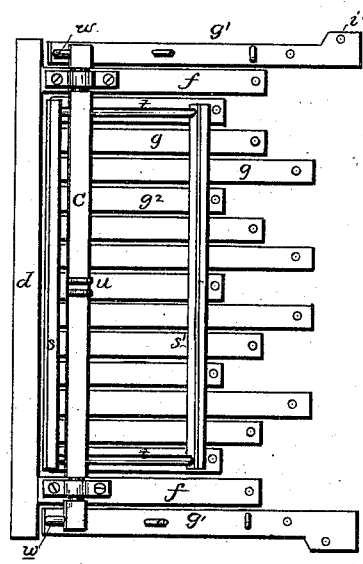

In the accompanying drawing, Figure 1 is a sectional elevation of my improved harrow, and Fig. 2 a plan view of the harrow-frame and tooth-arms.

The supporting-frame consists of the axle A, carried by the wheels B, the shafts $a$, beam $b$, and cross-bar $c$. The harrow-frame consists of the cross-piece $d$ and arms $ff$, and is suspended by adjustable bolts $e$ from the axle, and is braced by rods $h$.

Across the forward end of the harrow-frame extends a rod, $i$, to which are hung arms $g$ of different lengths, the longest arms $g^1$ being hung to the ends of the rod outside the frame, and having lateral projections $i'$, for a purpose described hereinafter.

In the present instance the arms within the frame are of three different lengths, arranged as shown in Fig. 2, the two longer series carrying the usual harrow-teeth $m$, and each arm $g^1$ carrying two of such teeth, but the rear tooth $m'$ extending from the projection $i'$ directly behind the wheel, so as to break up the ground directly in the wheel-track.

The short arms $g^2$ carry knife-blades $n$, which penetrate and cut the ground, and thereby facilitate the breaking of the same by the harrow-teeth.

As is well known, the ground in different fields, or in different parts of the same field, will often vary in character, hardness, &c., so that it is desirable for a greater pressure to be applied to the teeth at one time than at another.

In order to place the penetration of the teeth entirely under the control of the operator, I provide the harrow-frame with a rock-shaft, C, placed directly above the shaft $i$, and carrying on opposite sides parallel bars $s$ $s'$. This shaft is operated by a lever, I, connected by a link to an arm, $u$, of the rock-shaft.

By pushing forward the arm I the bar $s'$ is brought to bear upon the arms $g$ $g^2$ beneath, so as to depress them and force the teeth and knives into the ground to any desired extent. It will be seen, however, that this does not interfere with the independent movement of each arm, which, in passing over small hollows, may descend freely.

When the soil is light or soft a movement of the lever in the opposite direction will bring the bar $s$ upon the small ends of the arms and elevate the same, but without interfering with their independent movement in case any of the teeth should strike a stump or stone.

Short fingers or arms $w$, extending from the shaft C, serve to elevate the side arms $g^1$, and it will be apparent that a series of such short arms may be used instead of the two bars $s$ $s'$.

It will also be seen that different devices from those described may be used for elevating and depressing the tooth-arms—for instance, the lever I, which I term the "brake-lever," may be inserted directly in the shaft C. The arms and teeth may be constructed in any suitable manner—for instance, they may be made of a single bar of metal bent to an L shape.

Without limiting myself to the exact construction and arrangement of parts described, I claim—

1. A harrow consisting of a series of pivoted arms of different lengths, provided with pointed teeth and carried by a frame, wheels supporting said frame, a lever, and appliances, substantially as described, whereby the teeth may be either elevated or forced into the ground with a force proportionate to that applied to said lever, all as set forth.

2. The combination of the frame carried by the wheels, the lever I, the rock-shaft C, extending over the arms, the cross-bars $s\ s'$, and the series of tooth-arms pivoted to the frame, as specified.

3. The frame $d\ f\ f$, hung adjustably below the frame supported by the wheels and carrying pivoted tooth-arms $g\ g^1\ g^2$, and appliances, substantially as described, for elevating and depressing said arms by pressure on opposite sides of the pivot-rod, as set forth.

In testimony whereof I have signed my name to this specification in the presence of two subscribing witnesses.

COLUMBUS BUSWELL.

Witnesses:
HARRY MAYVILLE,
STILLMAN B. LORING.